W. H. HART, Jr.
MACHINES FOR MOLDING FABRICS.

No. 177,831. Patented May 23, 1876.

Witnesses:
Lewis F. Brous
A. P. Grant

Inventor:
Wm H. Hart Jr.
by John A. Wiedersheim
Attorney.

N. PETERS, PHOTO-LITHOGRAPHER, WASHINGTON, D. C.

UNITED STATES PATENT OFFICE.

WILLIAM H. HART, JR., OF PHILADELPHIA, PENNSYLVANIA.

IMPROVEMENT IN MACHINES FOR MOLDING FABRICS.

Specification forming part of Letters Patent No. 177,831, dated May 23, 1876; application filed April 4, 1876.

*To all whom it may concern:*

Be it known that I, WILLIAM H. HART, Jr., of the city and county of Philadelphia, and State of Pennsylvania, have invented a new and useful Improvement in Apparatus for Molding Paper, Fabric, and other pliable substances; and I do hereby declare the following to be a clear and exact description of the nature thereof, sufficient to enable others skilled in the art to which my invention appertains, to fully understand, make, and use the same, reference being had to the accompanying drawings, making part of this specification, in which—

Figure 1:
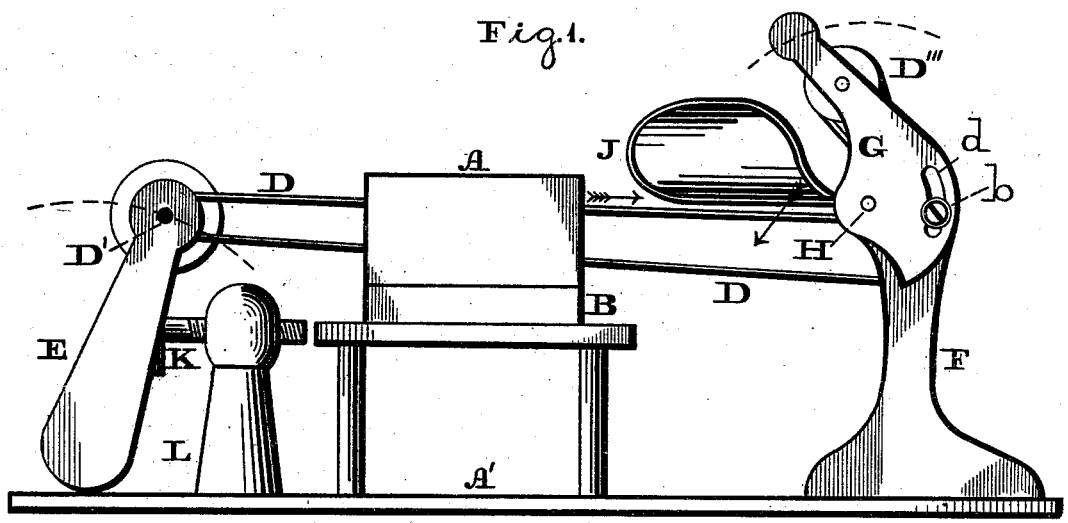
Figure 2:
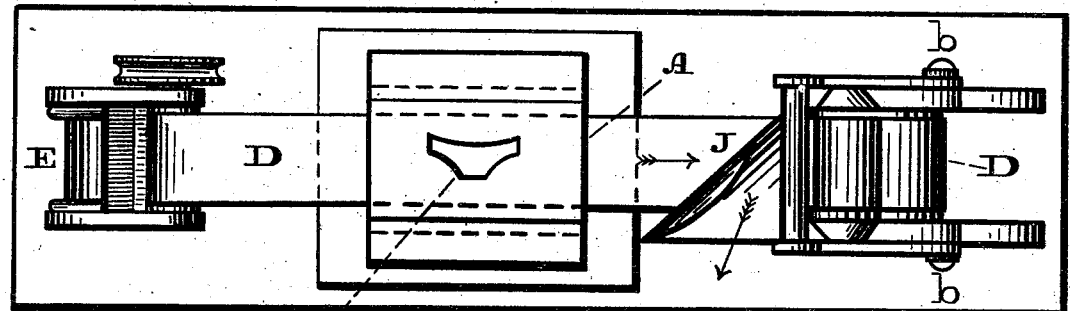
Figure 3:
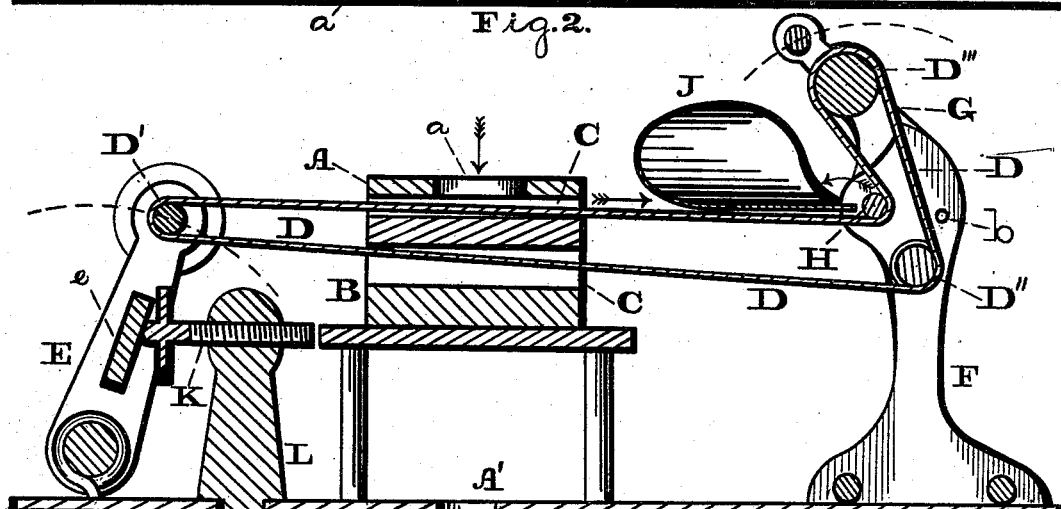

Figure 1 is a side view of the apparatus embodying my invention. Fig. 2 is a top or plan view thereof. Fig. 3 is a central longitudinal vertical section thereof.

Similar letters of reference indicate corresponding parts in the several figures.

My invention consists of a belt or conveyer, which is located beneath the die or the bed thereof, of a machine for cutting, stamping, punching, or otherwise shaping pieces of pliable substances, whereby the work may be inspected as it leaves the die and conveyed to other apparatus to be further operated upon, or to a place of collection. It also consists of a roller and a conveying-belt, so combined that articles passed between the roller and belt will be readily molded. It further consists of an axial frame or arm, and a screw arranged relatively thereto, so as to tighten the conveying-belt. It also consists in passing the conveying-belt around a pulley, which is mounted on an axial arm or frame, whereby the degree of molding may be adjusted.

Referring to the drawings, A represents the bottom plate or the die of a machine for cutting, stamping, punching, or otherwise shaping or operating upon pieces of pliable substances. The die A is supported on a bed, B, in which there are two longitudinally extending channels, C, through which runs a horizontally-extending endless belt or conveyer, D, whose supports are on rollers D′ D″ D‴, the roller D′ being mounted on an arm or frame, E, pivoted to the base A′; the roller D″ mounted on an upright or support, F, secured to the base opposite the arm or frame E, and the roller D‴ mounted on an arm or frame, G, which is pivoted to the upright or support F, the roller D‴ being located above the roller D″. To the upright or support F there is mounted a roller, H, which is arranged between the rollers D″ D‴, and is in contact with the outer surface of the endless conveyer D, so that the latter passes around said roller H and the rollers D′ D″ D‴. To the upright F there is secured a chute, J, which extends horizontally over the conveyer D, and transversely thereto, and has one end adjacent to the roller H.

The operation is as follows: The piece of pliable substance falls from the bottom die, or the punch or other tool to which it is subjected, through the opening $a$ of the die or plate A, or otherwise, or an opening which communicates therewith, so as to reach the conveyer D, which latter, being in motion, carries the pliable piece under the roller H, the conveyer pressing against it, and thus imparts a mold or curved shape to said piece. As soon as the piece has fully emerged from between the roller and conveyer it falls on the chute J, and is thus directed to a place of discharge or collection, or to other apparatus, so as to be further operated upon.

It will be seen that the conveyer runs below the plate A, and thus the pieces of unmolded substance falling thereon through the opening $a$ may be readily inspected, and if the work is not perfect or correct it will be perceived, and attention may be paid thereto.

The degree of molding to meet the requirements of various kinds of work may be readily adjusted by means of the arm or frame G. By moving said arm inwardly or in a direction toward the plate A, the conveyer D will envelop or lap a great extent of the roller H, whereby the substance to be molded will be molded with a greater curve. By moving the arm outwardly, the conveyer will envelop or lap a less extent of the roller H, and thus the substance will be molded with a less curve. When the arm G is adjusted it will be held in its position by means of set-screws $b$, which pass through curved slots $d$ in the arm into the standard F.

The conveyer D may be tightened, as occasion requires, by means of a screw, K, which is fitted to a standard, L, rising from the base A', and its head bears against a cross-bar, e, of the pivoted arm or frame E, which carries the roller D', around which passes the conveyer.

By rotating the screw in one direction the arm or frame E will be moved outwardly, and thus the conveyer will be tightened. When the screw is rotated in the other direction the arm or frame is permitted to move inwardly, and thus the conveyer will be slackened.

Having thus described my invention, what I claim as new, and desire to secure by Letters Patent, is—

1. The bed B, with channels C C, in combination with the conveyer or belt D passed therethrough, substantially as and for the purpose set forth.

2. The endless conveyer D, supported on rollers D' D", in combination with an elevated roller D''', and the interposed molding-roller H, forming together an improvement in molding apparatus, substantially as and for the purpose set forth.

3. The combination, with the rollers D" D''' and molding-roller H, of the roller D', supporting the endless conveyer D, and mounted on the adjustable tightening arm or frame E.

4. The combination, with the roller D" and molding-roller H, mounted on the support F of the elevated roller D''', supporting the endless conveyer D, and mounted on the adjustable arm or frame G, which is pivoted to said support F, substantially as and for the purpose set forth.

WM. H. HART, JR.

Witnesses:
JOHN A. WIEDERSHEIM,
JNO. A. BELL.